United States Patent
Whynot

(10) Patent No.: US 9,900,553 B2
(45) Date of Patent: Feb. 20, 2018

(54) MULTI-STREAM VIDEO SWITCHING WITH SELECTIVE OPTIMIZED COMPOSITE

(71) Applicant: Avaya Inc., Santa Clara, CA (US)

(72) Inventor: Stephen R. Whynot, Allen, TX (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/395,984

(22) Filed: Dec. 30, 2016

(65) Prior Publication Data
US 2017/0111613 A1   Apr. 20, 2017

Related U.S. Application Data

(62) Division of application No. 14/695,304, filed on Apr. 24, 2015, now Pat. No. 9,538,139.

(51) Int. Cl.
*H04N 7/15* (2006.01)
*H04N 7/14* (2006.01)

(52) U.S. Cl.
CPC ............. *H04N 7/152* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 5,757,781 A * | 5/1998 | Gilman | H04N 7/147 348/14.08 |
| 7,266,295 B2 * | 9/2007 | Ovadia | H04Q 11/0066 370/217 |
| 9,538,139 B2 | 1/2017 | Whynot | |
| 2012/0127262 A1 | 5/2012 | Wu et al. | |
| 2013/0297679 A1 * | 11/2013 | Kim | H04N 21/2343 709/203 |
| 2014/0003789 A1 * | 1/2014 | Konduru | H04N 21/4542 386/230 |

OTHER PUBLICATIONS

Official Action for U.S. Appl. No. 14/695,304, dated Jun. 2, 2016 5 pages.
Notice of Allowance for U.S. Appl. No. 14/695,304, dated Aug. 26, 2016 7 pages.

* cited by examiner

*Primary Examiner* — Creighton Smith
(74) *Attorney, Agent, or Firm* — Sheridan Ross P.C.

(57) ABSTRACT

A method of facilitating a multi-participant communication session with an efficient use of network bandwidth and processing resources is described. The processing resources are made available to the session participants via a switching fabric and composites of less active session participants can be used to minimize the bandwidth utilization between a media server and endpoints.

20 Claims, 12 Drawing Sheets

US 9,900,553 B2

MULTI-STREAM VIDEO SWITCHING WITH SELECTIVE OPTIMIZED COMPOSITE

CROSS REFERENCE TO RELATED APPLICATION

The present application is a divisional of U.S. patent application Ser. No. 14/695,304, filed Apr. 24, 2015, now U.S. Pat. No. 9,538,139, entitled "Multi-Stream Video Switching with Selective Optimized Composite", which is incorporated herein by this reference in its entirety.

FIELD OF THE DISCLOSURE

The present disclosure is generally directed toward communications and more particularly toward video-based communications.

BACKGROUND

Advantages of multi-stream/multi-spatial video switching architectures are well understood. High scalability, high quality, and low latency are included among the advantages of Scalable Video Coding (SVC) and video simulcast implementations. Disadvantages of these methods, however, include higher bandwidth usage as the number of participants increase, and any single stream devices are limited to one participant.

Traditional video conferencing solutions create a composite consisting of multiple video windows resized and arranged in a configurable layout. The result is a single video image containing all participants, delivered from the conferencing mixer to each participant over a single stream. The advantages of this method include bandwidth efficiency and less dependence on client capabilities. But disadvantages include scalability issues, high latency, less efficient use of resources, and less flexibility in window placement on the endpoints.

SUMMARY

Multi-stream and traditional video conferencing both have their advantages and disadvantages. Embodiments of the present disclosure seek to exploit the advantages of both approaches by combining the approaches and using multi-stream as the core of the video conference.

It is, therefore, one aspect of the present disclosure to provide a combined multi-stream switching fabric, which may also be referred to as an "SVC" router, or "video router", or video multi-stream switcher. In some embodiments, the switching fabric described herein is capable of supporting multiple codecs including non SVC codecs. It should also be appreciated that the switching fabric described herein may correspond to a back-to-back media relay. In this model each session is assigned a unique SSRC, timestamp, sequence number and SRTP security context to mask the dynamic nature of the switching fabric resources. In some embodiments, the switching fabric comprises a video switching software fabric core, with a composite video processing function that can be utilized on demand (e.g., during an in-progress conference). As an example, conferences start out as multi-stream switched to a configured participant limit. As a non-limiting example, the configured participant limit may be three, four, five, . . . , ten or more participants depending upon the technology employed, bandwidth availabilities, and user preferences. In an example of five participants, four stream can be delivered to each endpoint, thereby enabling each participant to see/view every other participant (e.g., four because you don't see yourself). On the endpoint, four windows can be presented, with one participant being presented in each window.

Continuing the example, if a sixth participant joins the conference (thereby exceeding the configured participant limit), video processing resources are surveyed for availability. If video processing resources are available and successfully allocated, the two least active speaker streams can be composited, and sent on one of the four streams to all endpoints. At the endpoint, a user sees three windows with one participant each, and a fourth with two participants (e.g., the two least active speakers). Using the paradigm, the active talker is switched and remains in a window that utilizes very low latency, thereby maintaining an acceptable video conferencing experience. It should be appreciated that it is acceptable for the media server to use 100% processed video for endpoints which can only support receiving one stream.

As more participants join the in-progress conference, they are "packed" into a subset of the windows. Two or more windows may be dedicated for switching (e.g., the two most active speakers) to provide a premium low latency experience with scale. Devices which join the conference that are non multi-stream capable can be allocated video processing resources on demand, or receive a single window switched stream. A minimally capable endpoint with only two receive streams could see many more participants with less network resources than either switched or processing methods alone. The decoding, composite and encoding is much more efficient than a typical processed video conference. First, an optimal spatial video layer can be used for decoding. This may be the base layer at a low resolution, for example 180p. Fewer processing resources are required to decode the lower resolution video. This provides much greater scale, and the ability to process video efficiently in software.

In a traditional video conference solution, the decoding would be on a high resolution (e.g., 720p or higher) stream from each endpoint, which requires more resources (this is where hardware acceleration and digital signal processors are typically deployed). Second, only a portion of the conference is being processed, lowering resource requirements. Third, the resources can be added behind the switching fabric on demand and only when required (e.g., when video switching is not adequate), thereby lowering the video processing resource requirements even further. Finally, if resources are not available, the conference can continue in a switching mode, where in the traditional video conference solution, resources are required up front or the call is rejected. This simplifies engineering and is a natural way to provide premium service to select individuals easily.

Compared to existing "dual" hybrid solutions with a Multi-Point Control Unit (MCU) and a cascading media server, the proposed solution is less complex and less costly to implement. Embodiments of the present disclosure can provide very high scale video conferencing, augmented with bandwidth efficient compositing on demand where required, and in software. The multi-stream switching is used in conjunction with the video processing to minimize video decoding and encoding demands. This is achieved by utilizing video switching up to a configured stream/window limit, and then applying processing resources on the remainder of the streams, and switching out the composited video. In addition, utilizing the multi-spatial streams being received to select the appropriate layer to decode further reduces video processing resource consumption.

In other words, it is an aspect of the present disclosure to provide a video switching fabric at the core of a video conference and combine multi-stream video with embedded optimized on-demand compositing.

In some embodiments, a conferencing method is provided that generally comprises:

determining that a number of participants involved in a communication session exceeds a predetermined threshold;

in response to determining that the number of participants involved in the communication session exceeds the predetermined threshold, creating a composite of at least two media streams for delivery along with other individual media streams to a communication device of a first participant, wherein the composite is encoded to utilize less bandwidth than the streams that make up the composite individually; and causing the combined media stream to be delivered to the communication device of the first participant in addition to the switched video streams so that the communication device of the first participant presents the composite in a viewing screen along with the other individual media streams in separate viewing screens.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous conferencing environments such as video conferencing environments, audio conferencing environments, multi-media conferencing environments, etc.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

Figure 1:
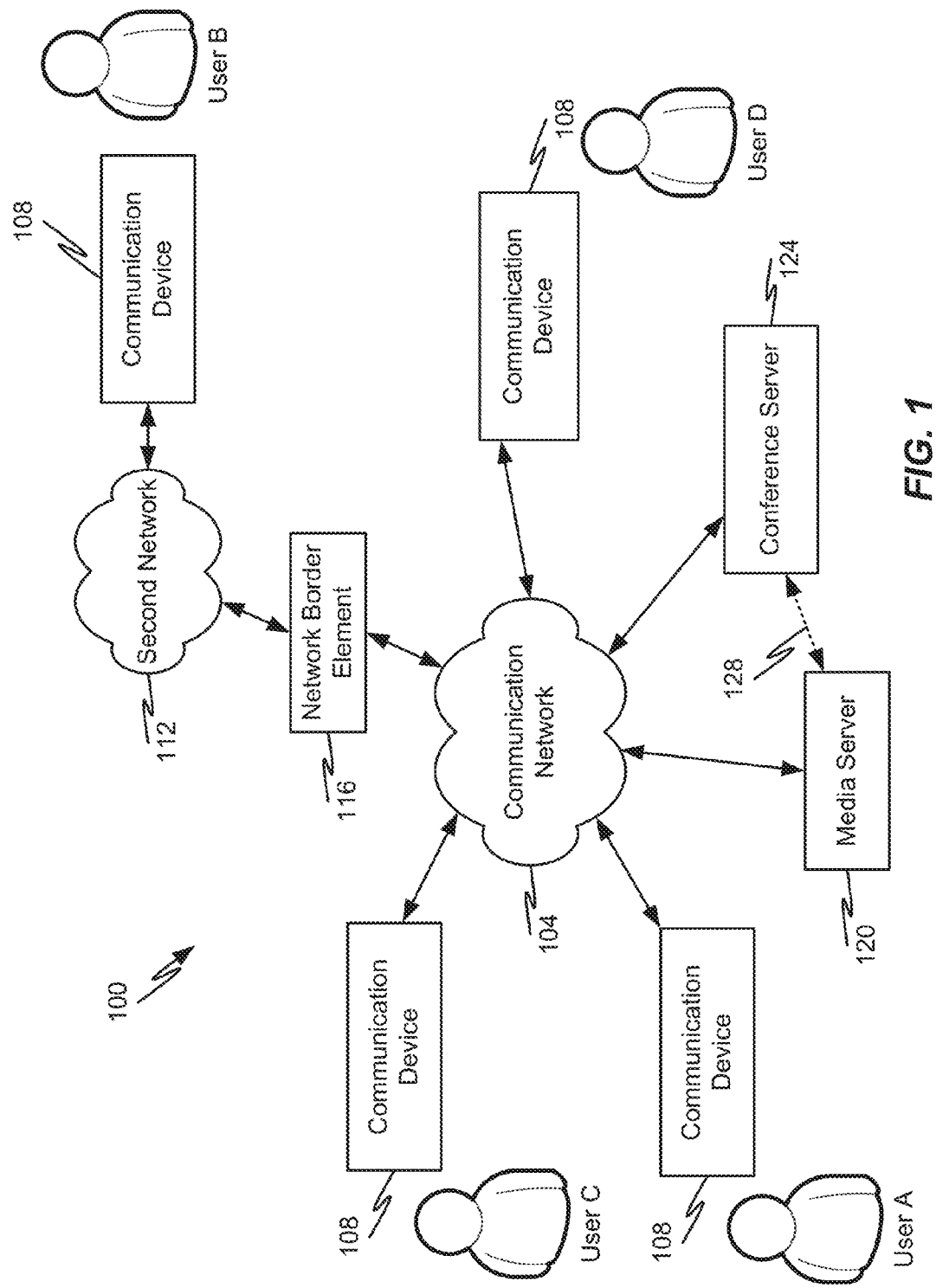
FIG. 1 is block diagram depicting a communication system in accordance with embodiments of the present disclosure.

With reference initially to FIG. 1, an illustrative communication system 100 in which collaboration amongst a plurality of users is facilitated as will be described in accordance with at least some embodiments of the present disclosure. The system 100 is shown to include a communication network 104, multiple communication devices 108 (operated by one or more users), a second communication network 112, an optional border element 116 between the networks 104, 112, a media server 120 and a conference server 124.

In accordance with at least some embodiments of the present disclosure, the communication network 104 and second network 112 may comprise any type of known communication medium or collection of communication media and may use any type of protocols to transport messages between endpoints. The communication networks 104, 112 may include wired and/or wireless communication technologies. The Internet is an example of the communication network 104, 112 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, a contact center, and any other type of packet-switched or circuit-switched network known in the art. In addition, it can be appreciated that the communication network 104, 112 need not be limited to any one network type, and instead may be comprised of a number of different networks and/or network types. Moreover, the communication network 104, 112 may comprise a number of different communication media such as coaxial cable, copper cable/wire, fiber-optic cable, antennas for transmitting/receiving wireless messages, and combinations thereof. In some embodiments, the communication network 104 may correspond to a public network (e.g., the Internet) whereas the second network 112 may correspond to a private network administered by a private enterprise with personalized security rules. Thus, the network border element 116 may comprise functionality to secure the second network 112 from attempted attacks from the public network 104. Examples of a network border element 116 or functions that may be performed thereby include, without limitation, a firewall, a Session Border Controller (SBC), a Network Address Translator (NAT), or the like.

In some embodiments, a communication device 108 may include a personal communication device or a shared communication device (e.g., a conference phone). Examples of suitable communication devices 108 include, without limitation, a telephone, a softphone, a cellular phone, a multi-speaker communication device (e.g., conference phone), a video phone, a PC, a laptop, a tablet, a PDA, a smartphone, a thin client, or the like. The communication devices 108 may be pure consumers of audio/video (e.g., having a speaker only and/or having a screen only), pure producers of audio/video (e.g., having a microphone and/or camera only), or consumers and producers of audio/video. It should be appreciated that a communication device 108 may be configured to support single or multi-user interactions with other network-connected devices within an enterprise communication network and/or across multiple communication networks (e.g., across Session Border Controllers (SBCs)). In the depicted embodiment, each communication device 108 has a single user associated therewith, but it should be appreciated that a single communication device may be shared by more than one user without departing from the scope of the present disclosure.

The media server 120 may correspond to one or more servers (e.g., a single server or a server cluster) that facilitates the distribution and sharing of media between communication session participants. In some embodiments, the media server 120 may be configured to receive a plurality of media streams from each communication device 108 involved in a communication session and then distribute those streams to the other participants. The media server 120 may, therefore, correspond to the media bridge and distribution center of a communication session or conference.

The conference server 124 may correspond to a controller for the media server 120 and/or provide communication session participants the ability to control various aspects of the communication session. In some embodiments, the conference server 124 may instruct the media server 120 to distribute different types of media to different participants, depending upon each participant's involvement in the session. For instance, the conference server 124 may instruct the media server 120 to transmit higher resolution voice and/or video media for a first participant to other participants if that first participant is a more active participant in the communication session (e.g., speaking more frequently, asking more questions, moving more, etc.). Conversely, the conference server 124 may instruct the media server 120 to transmit lower resolution voice and/or video media for a second participant to other participants if that second participant is less active in the communication session (e.g., speaking less frequently, asking fewer questions, moving less, etc.). As shown in FIG. 1, the conference server 124 may have an optional control link directly to the media server 120 to provide control instructions and receive status information for the media being distributed by the media server 120. Alternatively or additionally, the conference server 124 may communicate with the media server 120 via the communication network 120. In still other embodiments, the functionality of the conference server 124 and media server 120 may be incorporated into a single server or collection of servers that are co-located with one another.

The media server 120 may correspond to a device (e.g., server) or collection of devices that enable media compositing and distribution during a communication session between two or more and usually three or more session participants. In some embodiments, the media server 120 may include a media mixer and logic for distributing the composited media among the conference participants. The media server 120 may even provide a fully-composited version of the conference to each participant or user's communication device 108.

Figure 2:
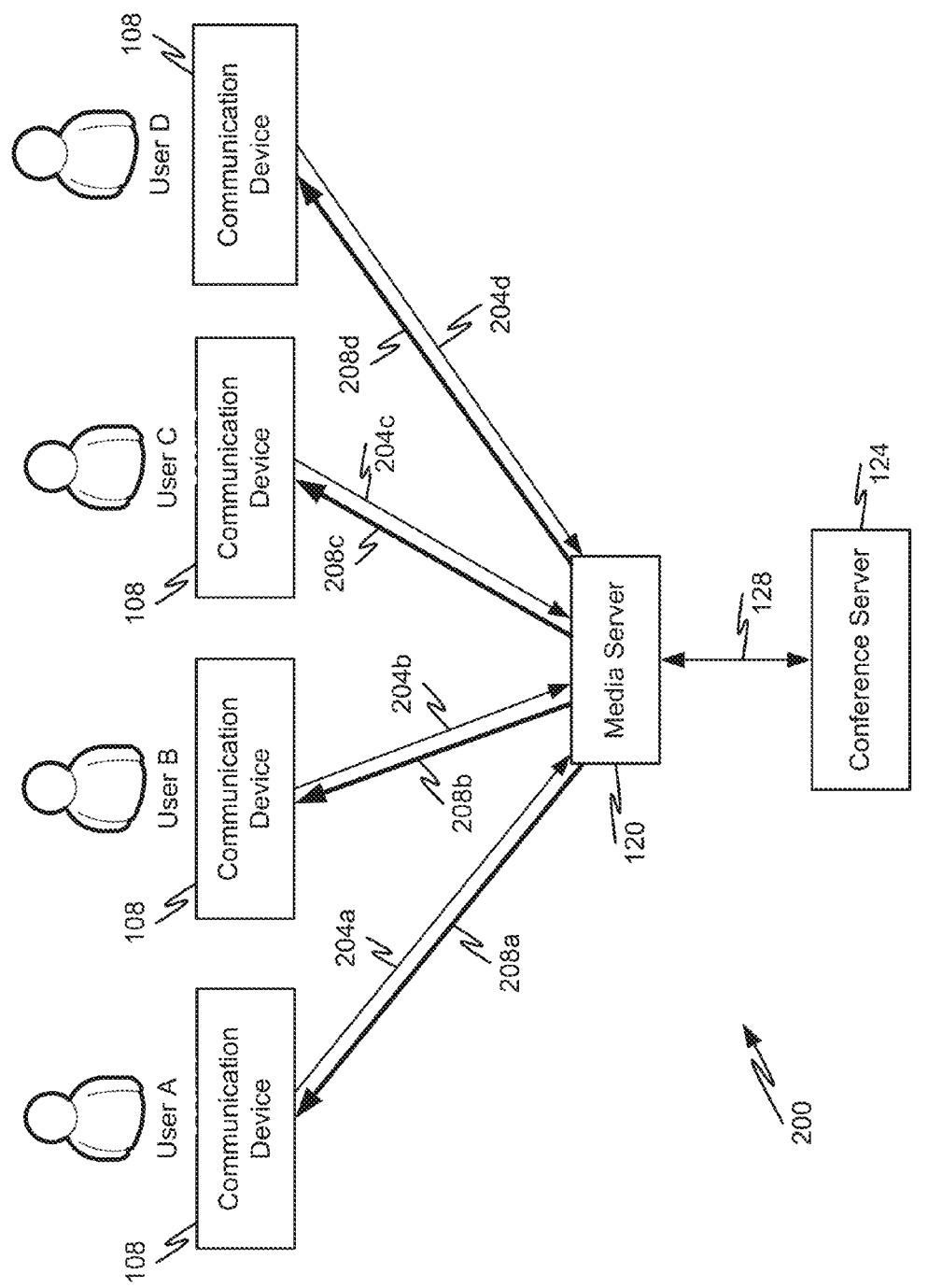
FIG. 2 is a block diagram depicting additional details of a communication system in accordance with embodiments of the present disclosure.

With reference now to FIG. 2, additional details of a system 200 for sharing media between conference participants will be described in accordance with at least some embodiments of the present disclosure. As shown in FIG. 2, each communication device 108 involved in a communication session may receive a media stream 208a, 208b, 208c, 208d from the media server 120 that corresponds to a combination of at least some media being provided to the media server 120 by each communication device 108. More specifically, the first user's (e.g., User A) communication device 108 may provide a first media stream 204a to the media server 120. The first media stream 204a may correspond to encoded voice and/or video content captured by a camera and/or microphone of User A's communication device 108 and delivered to the media server 120 via communication network 104, 112. The second user's (e.g., User B) communication device 108 may provide a second media stream 204b to the media server 120. The second media stream 204b may correspond to encoded voice and/or video content captured by a camera and/or microphone of User B's communication device 108 and delivered to the media server 120 via communication network 104, 112. The third user's (e.g., User C) communication device 108 may provide a third media stream 204c to the media server 120. The third media stream 204c may correspond to encoded voice and/or video content captured by a camera and/or microphone of User B's communication device 108 and delivered to the media server 120 via communication network 104, 112. The fourth user's (e.g., User D) communication device 108 may provide a fourth media stream 204d to the media server 120. The fourth media stream 204d may correspond to encoded voice and/or video content captured by a camera and/or microphone of User B's communication device 108 and delivered to the media server 120 via communication network 104, 112. Although FIG. 2 shows four participants to the communication session/conference, it should be appreciated that embodiments of the present disclosure can accommodate a greater or lesser number of participants. In fact, embodiments of the present disclosure are better suited to gain efficiencies with a larger number of participants as will be described in further detail herein.

The media server 120 receives all of the media content from each communication device 108 and is configured to build composited media streams 208a, 208b, 208c, 208d and distribute the composited media streams to each conference participant. The composited media streams distributed to the conference participants may be the same or they may be different (e.g., specific to the participant). In some embodiments, the first combined media stream 208a may only comprise content from the second media stream 204b, third media stream 204c, and fourth media stream 204d. Similarly, the second media stream 208b may only comprise content from the first media stream 204a, the third media steam 204c, and the fourth media stream 204d. In other words, the media server 120 may be intelligent enough to not provide media back to a communication device 108 that already sent that media. Instead, a user may be allowed to view their own local media feed with a local feedback rather than requiring their media to travel back and forth between the media server 120.

The conference server 124 may be further configured to instruct the media server 128 to provide different resolution of media to different communication devices 108 depending upon the relative involvement and/or activity of a particular conference participant. For instance, if all participants are highly involved in a communication session, then the media server 120 may provide the highest resolution (or lowest latency) media to all other participants. However, as the number of participants grows, there will be a greater opportunity to identify those participants that are less involved in a communication session than others. In such a circumstance, the conference server 124 may instruct the media server 120 to provide lower bandwidth or higher latency media on the composited media streams 204a-d for the less active participants. Thus, the combined media stream 208a, 208b, 208c, and/or 208d may comprise a composite of higher resolution media (for more active participants) and lower resolution media (for less active participants). In some embodiments, the media server 120 may transcode or lower the resolution of media received from a media stream 204a, 204b, 204c, 204d prior to compositing it with other media streams 204a, 204b, 204c, 204d to create a combined media stream 208.

It should be kept in mind that with SVC or simulcast architectures, the clients/endpoints send multiple spatial layers (multiple resolutions), as well as multiple temporal layers (possible frame rates), and multiple quality layers, or a combination thereof. SVC codecs support this behavior natively. The simulcast approach can be done without an SVC codec, by using a traditional codec and performing multiple encodes and sending those to the server. The key is the server can choose the resolution which matches the endpoint and/or network requirements for either switching or processing (for compositing). Ideally, the media server chooses the resolution to composite that is closest to the target in resolution so it doesn't waste cpu decoding higher resolution video.

Figure 3:
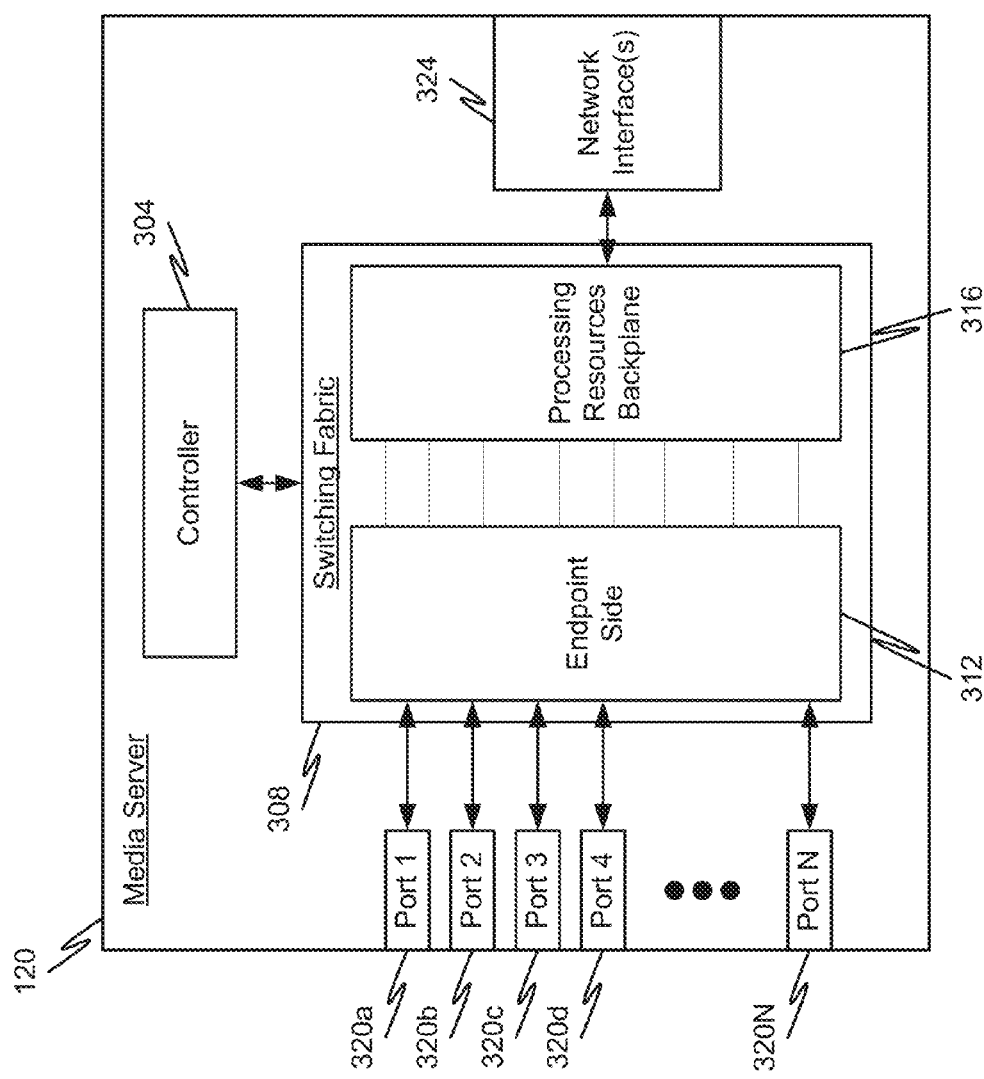
FIG. 3 is a block diagram depicting details of a media server in accordance with embodiments of the present disclosure.

With reference now to FIG. 3, additional details of a media server 120 will be described in accordance with at least some embodiments of the present disclosure. The media server 120 is shown to include a controller 304, switching fabric 308 including an endpoint side 312 and a processing resources backplane 316, a plurality of endpoint ports 320a-N, and one or more network interfaces 324 for interfacing with processing resources. In some embodiments, the processing resources backplane 316 corresponds to an IP network or the like. Thus, the backplane may be logical in nature as it is an IP network using IP protocols.

In some embodiments, the controller 304 may include functionality of the conference server 124 or the controller 304 may be configured to implement actions consistent with instruction received from the conference server 124. The controller 304 controls operations of the switching fabric 308, which basically enables a connection between the endpoint side 312 of the switching fabric 308 and the processing resources backplane 316. In other words, the controller 304 may control the types and number of interconnections between the endpoint side 312 and the processing resources backplane 316. The endpoint side 312 of the switching fabric 308 interfaces with the ports 320a-N of the media server 120 that are exposed to communication devices 108. The ports 320a-N may be specifically addressed or made dynamically available depending upon need. Each port may correspond to an Ethernet port or similar interface between the communication network 104, 112 and the media server 120. The ports used are TCP or UDP ports, but typically would be UDP since RTP is transported most commonly over UDP. The media server may use one or more network interface ports (typically Ethernet connected to a layer 2/3 switch) to communicate with the endpoints and the processing resources. Both could be reached through a single Ethernet port on the server, or multiple. We could use a dedicated Ethernet port for the processing resources if we want, or multiple, same for the endpoints, or we could share one. In other words, the ports 320a-N provide the physical interface between the media server 120 and the communication network 104, 112, thereby enabling the media server 120 to interact with the communication devices 108.

The network interface(s) 324 may be used to connect the media server 120 to one or more processing resources as the size of a communication session changes (e.g., grows or becomes smaller). In some embodiments, the media server 120 may utilize the switching fabric 308 to initially connect the communication devices 108 together with a single processing resource if the communication session is only among a small number of participants. If the number of participants grows, however, and additional processing resources are required to continue facilitating the communication session, the controller 304 may instruct the switching fabric 308 to connect the endpoint side 312 with more processing resources via the network interface(s) 324. In other words, as processing demands change during a communication session, the controller 304 may cause the switching fabric 308 to connect more or fewer processing resources. In the context of video processing resources, the video processing resources can be delivered to the communication devices 108 if and when required using the backplane 316 of the switching fabric 308. Each communication device 108 or endpoint may be anchored to the switching fabric 308 via the ports 320a-N. In some embodiments, each endpoint session attached to the switching fabric 308 has a unique SSRC, timestamp, sequence numbers, SRTP security contexts, and/or SDP negotiation options. Thus, each communication device 108 can negotiate the unique parameters of their connection with the media server 120, but receive the benefits of shared processing resources made available via the switching fabric 308.

In accordance with at least some embodiments of the present disclosure. The video processing resources made available via the switching fabric 308 may correspond to software-based processing resources, thereby enabling a flexible implementation and allowing for virtualization of the resources. Furthermore, the switching fabric 308 provides the ultimate flexibility in resource packing because resources can be swapped out and/or replaced with other resources without moving or re-inviting the endpoints/communication devices 108. The switching fabric 308 enables processing resources to be made available on-demand and/or during session setup. Furthermore, resource pools can be expanded or contracted dynamically (e.g., during a communication session) to adapt to processing requirements of the session (e.g., a session having a growing or shrinking number of participants).

Figure 4:
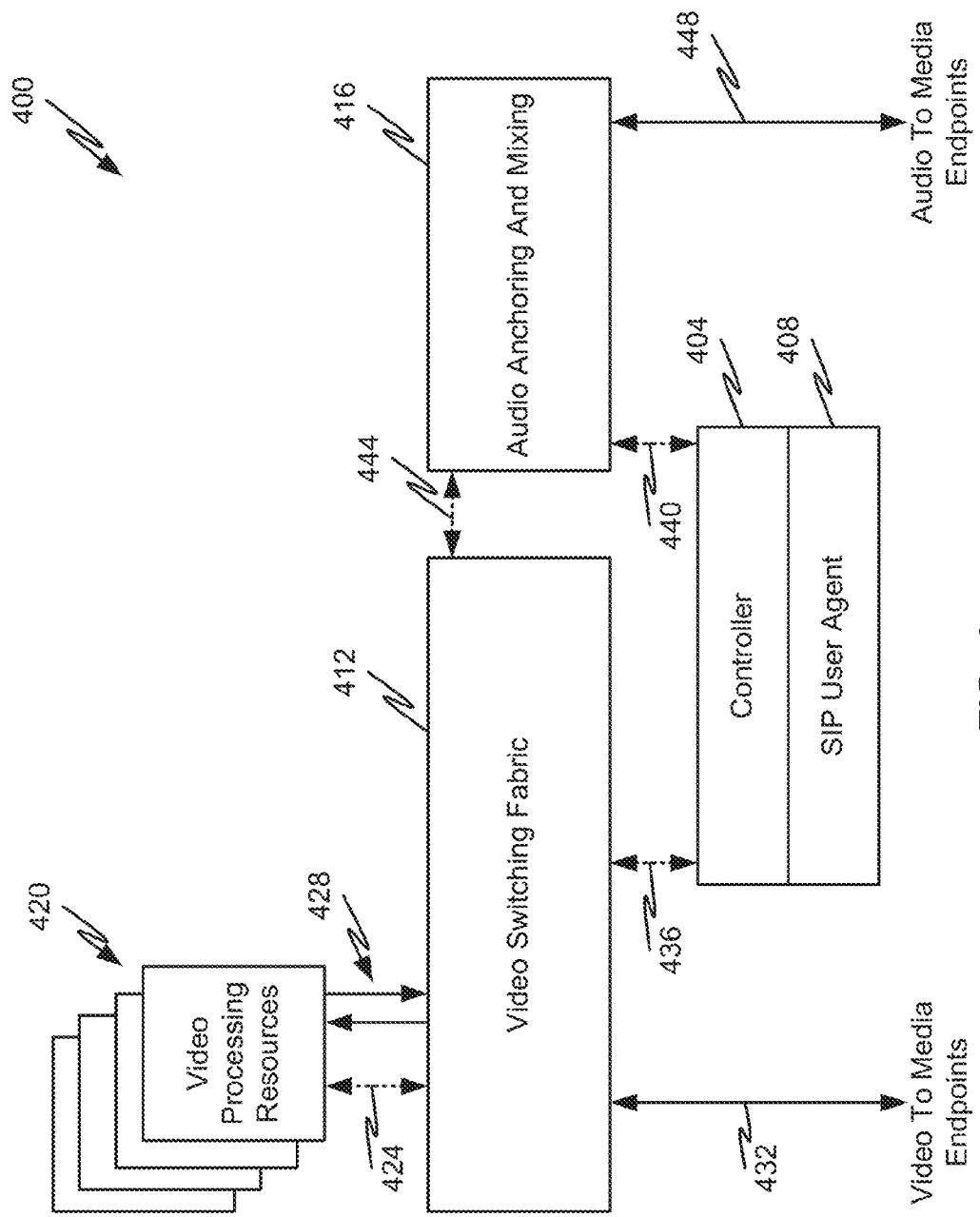
FIG. 4 is a block diagram depicting a switching architecture in accordance with embodiments of the present disclosure.

With reference now to FIG. 4, additional details of an intelligent and flexible processing system 400 will be described in accordance with at least some embodiments of the present disclosure. The system 400 is shown to include a plurality of video processing resources 420 made available to endpoints via a video switching fabric 412 and audio anchoring and compositing module 416. The video switching fabric 412 and/or audio anchoring and compositing module 416 may be incorporated in or similar to the switching fabric 308 or they may be provided as separate components of the media server 120.

The video processing resources 420 may correspond to software transcoding resources that are capable of being distributed across multiple servers for scale. The video processing resources 420 can be added to support an in-progress communication session seamlessly (e.g., without notifying any user of their addition). As discussed above, the transcoding in software enables support for virtualization as well as scaling schemes through the pooling of servers. In some embodiments, an instance of each video processing resource may run co-resident on the same server. It may be possible to provide a cluster of media server that share the same pool of video processing resources. In other words, a plurality of media servers 120 may share a common pool of video processing resources 420. A network control protocol 424 may be used to enable the exchange of control information and status information between the video processing resources 420 and the video switching fabric 412 whereas a media channel (e.g., video over LAN "backplane") can be used to carry media between the video processing resources 420 and the video switching fabric 412.

In the depicted embodiment, the endpoints/communication devices 108 are connected to the video processing resources 420 via the switching fabric 412. The switching fabric 412, in some embodiments, may correspond to a low-latency and high-capacity software video switching fabric that provides the most flexible resource selection options due to its high capacity. Video processing resources 420 can be delivered to communication devices 108 via the fabric 412 as opposed to endpoints being delivered to the video processing resources 420. A media channel 432 may be used to carry video (e.g., RTP, secure RTP, RTCP, secure RTCP) to/from communication devices 108. Likewise, media streams from communication devices may also be provided by media channel 432. Audio may be shared between communication devices 108 and the media server 120 via a separate communication channel 448, which is used to carry audio (e.g., RTP, secure RTP, RTCP, secure RTCP) to/from communication devices 108. A network control protocol 444 may be used to share audio and video synchronization data between the video switching fabric 412 and the audio anchoring and compositing module 416.

Network control protocols 436, 440 can be used to connect the controller 404 and SIP User Agent 408 to the video switching fabric 412 and audio anchoring and compositing module 416, respectively. The use of a separate controller 404 and SIP User Agent 408 may be contrasted to the media server implementation of FIG. 3 where the controller 304 was internal to the media server 120. In the embodiment of FIG. 4, there is no application or service logic in the media server and the controller 404 and SIP User Agent 408 use standard media control protocols to control the operations of the media server 120 as well as the switching fabric 412 and audio anchoring and compositing module 416 contained therein. As a non-limiting example, server media server 120 may be provided that has two transports for control protocols. One is SIP the other is HTTP/REST. More specifically, the media server may have a SIP useragent and a REST useragent. The type of UA used to control the media server is not significant, since the control protocols used are agnostic. In a non-limiting example, MSML over SIP or over REST can be used.

Figure 5:
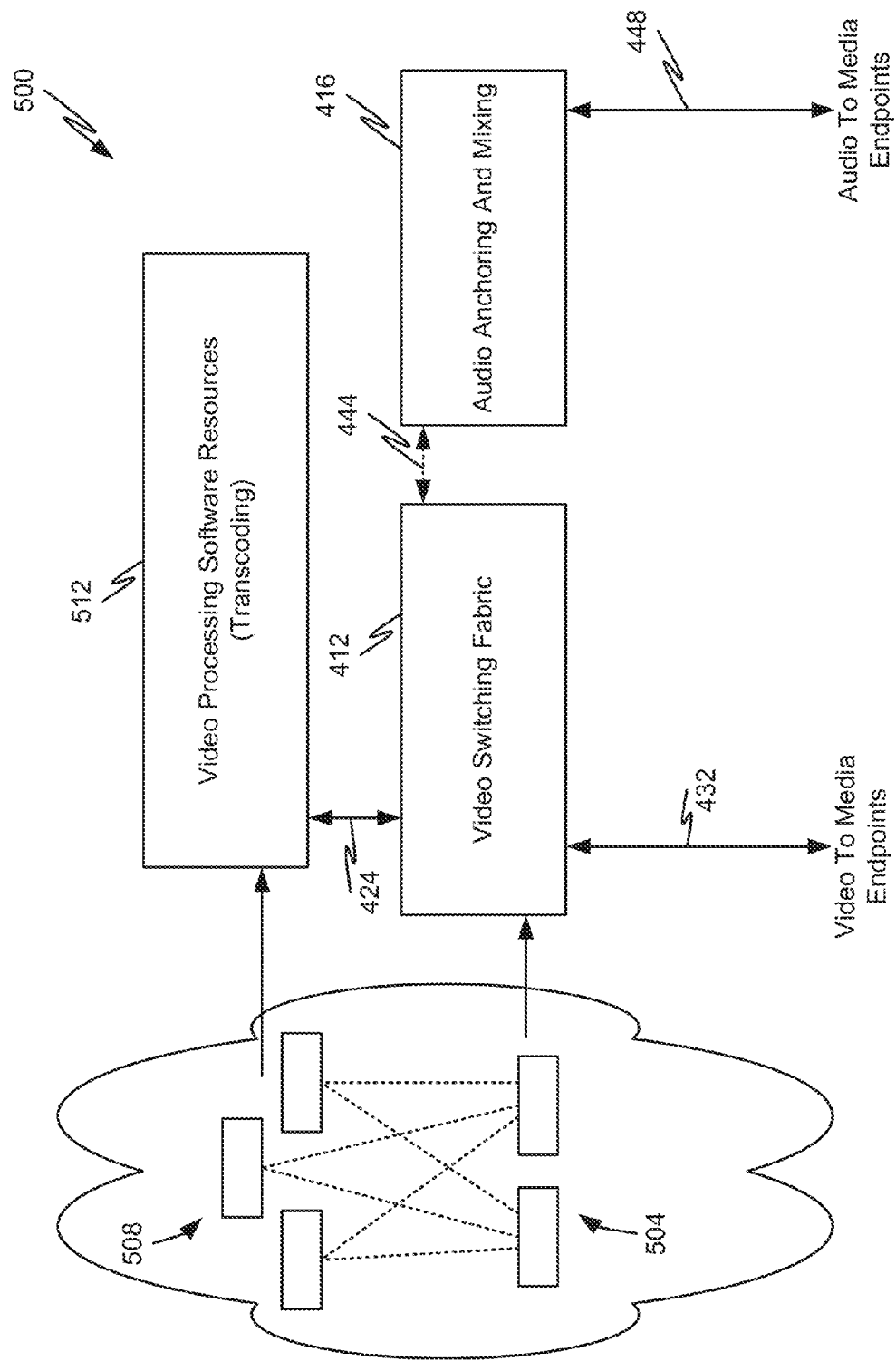
FIG. 5 is a block diagram depicting additional details of a switching structure in accordance with embodiments of the present disclosure.

FIG. 5 shows a slight variation to the system of FIG. 4, in that FIG. 5 depicts a system 500 where the video processing resources 508 are interconnected with a plurality of media servers 504 in a media server cluster. Each media server in the media server cluster 504 can be connected to or in communication with the video processing resources 508 and can cause one or a plurality of video processing resources to become part of the video processing resources 512 that are connected to the video switching fabric 412. Similarly, the plurality of media servers 504 may connect with the video switching fabric 412 thereby facilitating a number of different communication sessions over the fabric 412. Thus, the system 500 of FIG. 5 enables a highly flexible and extensible number of video processing resources to service multiple communication session simultaneously. The connections within the video switching fabric 412 and audio anchoring and compositing module 416 are controlled in such a way that each session receives the appropriate media streams and does not receive streams from other sessions.

Figure 6A:
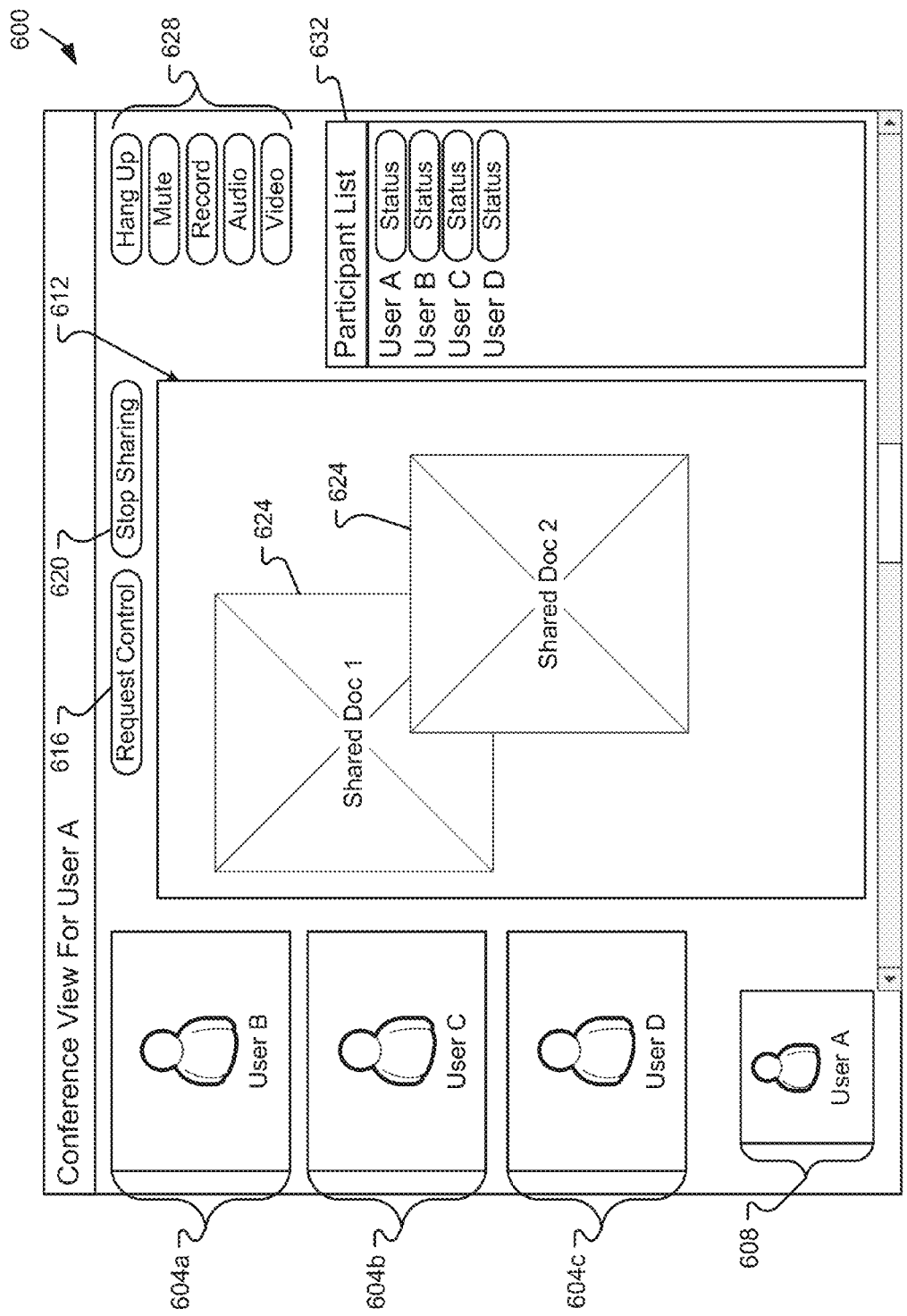
FIG. 6A is a screen-shot depicting a first conference view for a user involved in a video conference in accordance with embodiments of the present disclosure.

With reference now to FIG. 6A-6D, user conference views and a user experience associated with a conference call between a plurality of users will be described in accordance with at least some embodiments of the present disclosure. Referring initially to FIG. 6A, a first conference view for User A is shown to include a viewing window 600 having a plurality of conference view elements incorporated therein. The window 600 may be rendered via an application on the communication device 108, via a browser of the communication device 108, or a combination thereof. In some embodiments, the window 600 includes a plurality of video screens 604a, 604b, 604c for each of the other participants (e.g., User B, User C, User D) as well as a self-viewing screen 608 that enables User A to see the video information of himself that is being provided to the other participants. In some embodiments, the sizes of screens 604a, 604b, 604c may be the same, but larger as compared to the self-viewing screen 608, but the sizes of each or all of the screens may be specifically configured to accommodate each user's viewing preferences.

As discussed above, the content displayed in screens 604a, 604b, 604c may correspond to content received via the combined media stream 208a whereas the content displayed in screen 608 may correspond to content being delivered to media server 120 via the first media stream 204a. The media server 120 may provide each video feed via the combined media stream 208 with an index indicating metadata associated with the feed. Thus, the first video screen 604a knows to also present identifying information for User B and similar information for the other video screens.

Since collaboration is also enabled via the communication session, the window 600 may include other collaboration features such as a document sharing window 612, a plurality of control buttons 616, 620 for the document sharing window 612, a plurality of control buttons 628 for the audio and/or video portions of the collaboration, as well as a participant list 632. In some embodiments, the participants may be enabled to share views of their desktops or share documents 624 for collaboration and editing among the other participants. Each participant may request or obtain control and/or stop sharing a desktop view by utilizing the appropriate control buttons 616, 620. Moreover, a user may be allowed to hang-up on a call, mute their microphone, record some or all of the media streams, adjust audio parameters, and/or adjust video parameters with the appropriate control buttons 628.

The participant list 632 may include a display of each participant involved in the communication session. The information displayed in the participant list 632 may be received from the media server 120 or from the conference server 124. The status information displayed for a particular user in the communication session may include an indication of whether a particular user is speaking, not speaking, has their microphone on mute, is moving, or any other status information that can be shared amongst participants.

In some embodiments, each user displayed in the screens 604a, 604b, 604c may have their video information encoded similarly, which means that the resolution of each participant's video may be comparable or identical. Of course, if a particular user's communication device 108 does not support a higher level of encoding as compared to another user's communication device 108, then the media server 120 may provide the best resolution for each participant or, alternatively, provide a best common resolution for every participant.

Figure 6B:
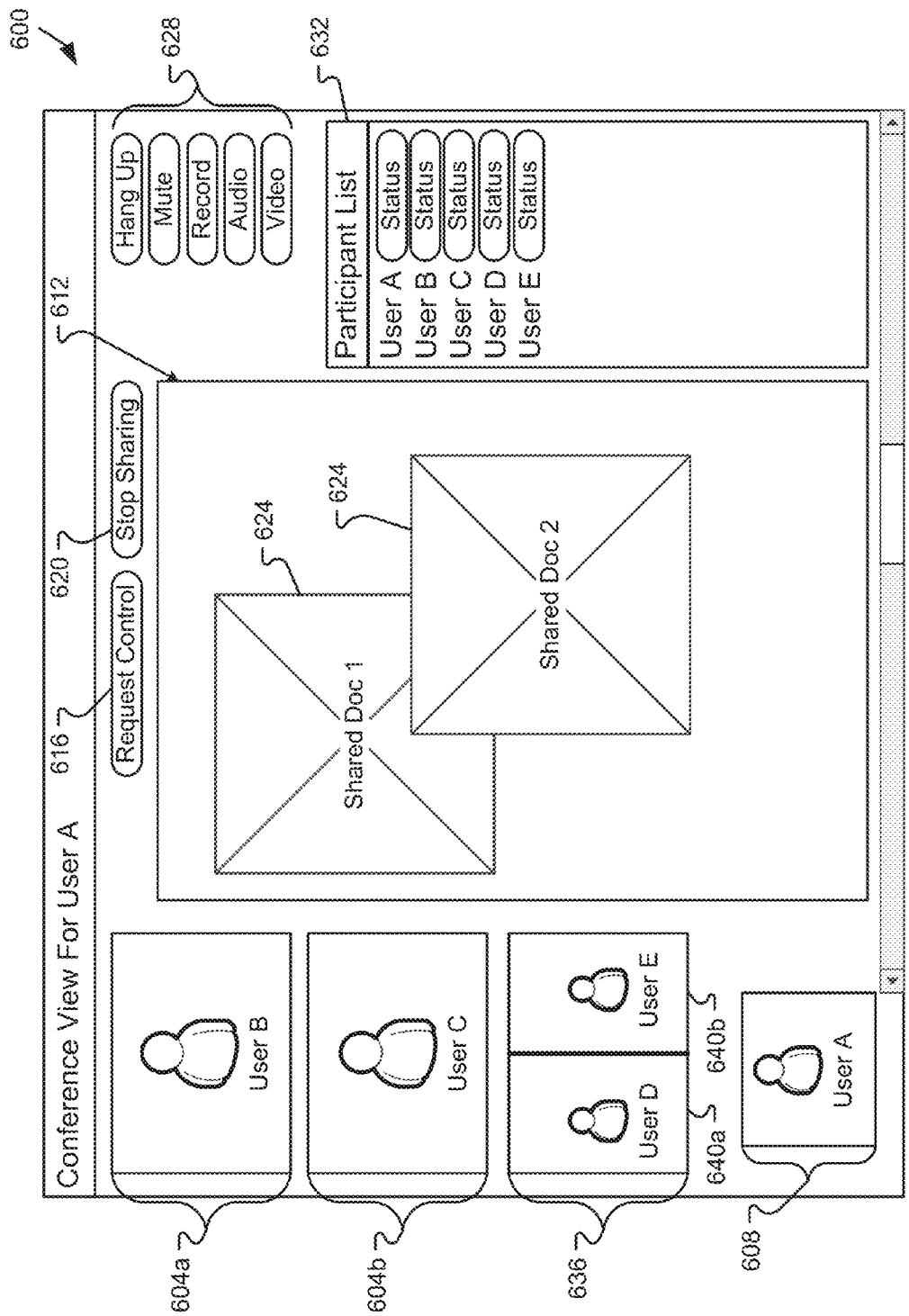
FIG. 6B is a screen-shot depicting a second conference view for a user involved in a video conference in accordance with embodiments of the present disclosure.

With reference now to FIG. 6B, the window 600 is updated to show that an additional user (e.g., User E) has joined the in-progress communication session. In accordance with at least some embodiments, the additional user (e.g., User E) can have their media displayed in a shared viewing screen 636 along with media from another user (e.g., User D). As an example, the other user displayed with the newly-added user may correspond to the least active user in the conference, the most junior user in the conference, or the like. Any other selection criteria for including users in the shared viewing screen 636 can be used without departing from the scope of the present disclosure.

Advantageously, since the overall size of the shared viewing screen 636 is approximately the same as the overall size of an individual screen 604a or 604b, there is not as much need for the highest resolution of video for the users displayed in the shared viewing screen 636. Thus, the media server 120 may know that User A is viewing Users D and E in the shared viewing screen 636 and, therefore, may provide a lower quality resolution or higher latency video in the combined media stream 208a for the portions attributed to Users D and E. This enables a bandwidth savings between the media server 120 and User A's communication device 108.

Figure 6C:
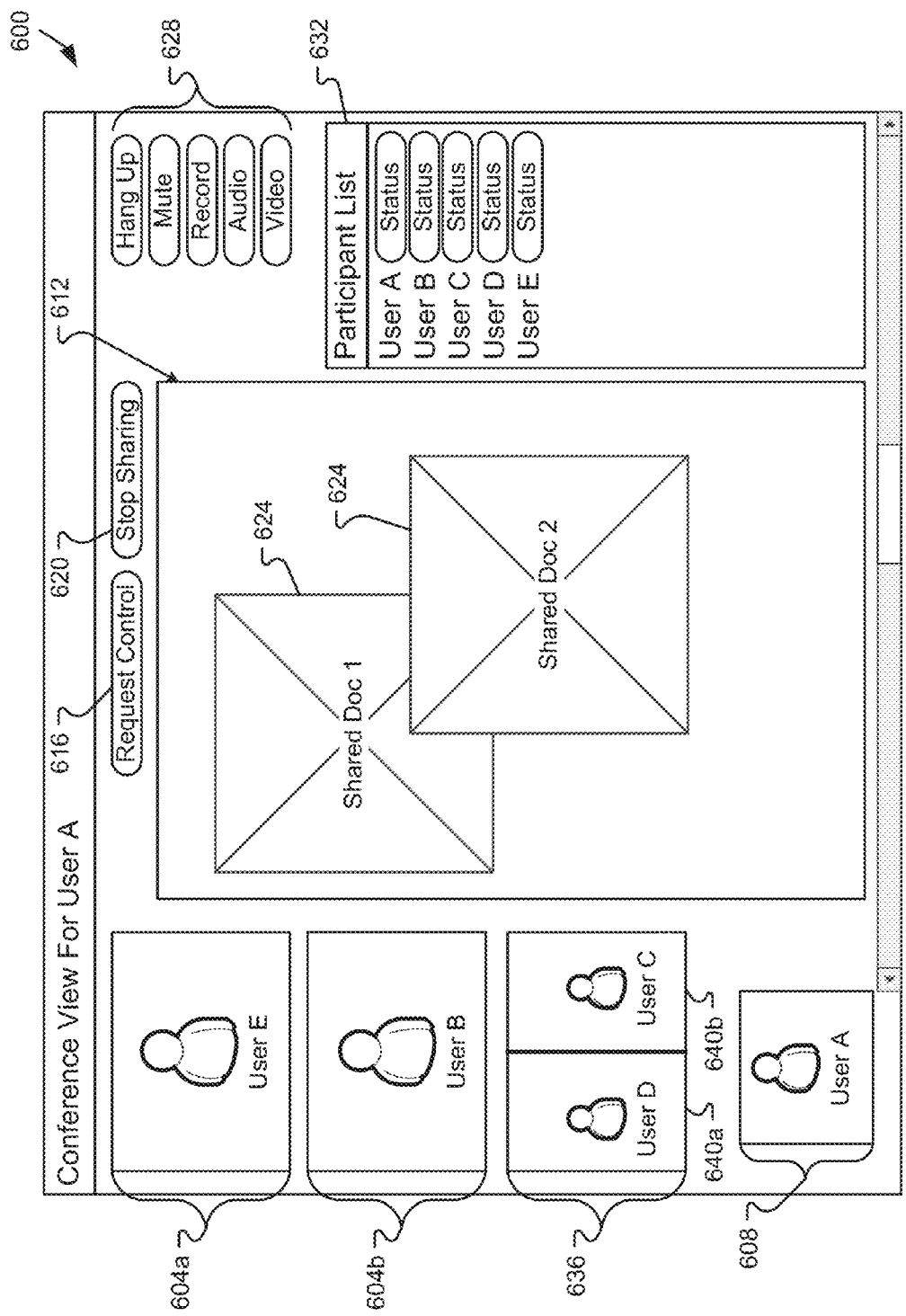
FIG. 6C is a screen-shot depicting a third conference view for a user involved in a video conference in accordance with embodiments of the present disclosure.

With reference now to FIG. 6C, the window 600 is shown to be updated to move User E into the top viewing screen 604a whereas now Users C and D are in the shared viewing screen 636. This movement may have been done in response to determining that User E is more active in the communication session (e.g., speaking more, moving more, sharing their screen, currently has control of the document sharing window 612, etc.) as compared to Users B, C, and D. In response to making a determination to move User E to the top viewing screen 604a, the other viewing screens 604b, 636 may also be updated such that the second viewing screen 604b displays User B and the shared viewing screen displays Users C and D. Again, even though five participants are involved in the communication session, the window 600 only has three viewing screens 604a, 604b, 636 in addition to the self-viewing screen 608 and since the users displayed in the shared viewing screen 636 are displayed in a smaller viewing area the resolution of their media is less important than the resolution of the media for Users B and E. Furthermore, User A may also tolerate higher latency for the media of Users C and D since they are less active and, presumably, listening to Users E and B more than speaking and providing actual content to the communication session.

In some embodiments, the status of each participant may also be updated to reflect that a particular user is being displayed in a particular location of User A's window 600. For instance, the status depicted for User E may indicate that he is most active whereas the status depicted for User B may indicate that she is currently controlling the document sharing window 612. The status for User A, as an example, may indicate whether User A is in one or more shared screens 636 of other participants, whether User A is in a primary viewing screen 604 of other participants, and to what extent, if at all, User A's media is being transcoded for the other users.

Figure 6D:
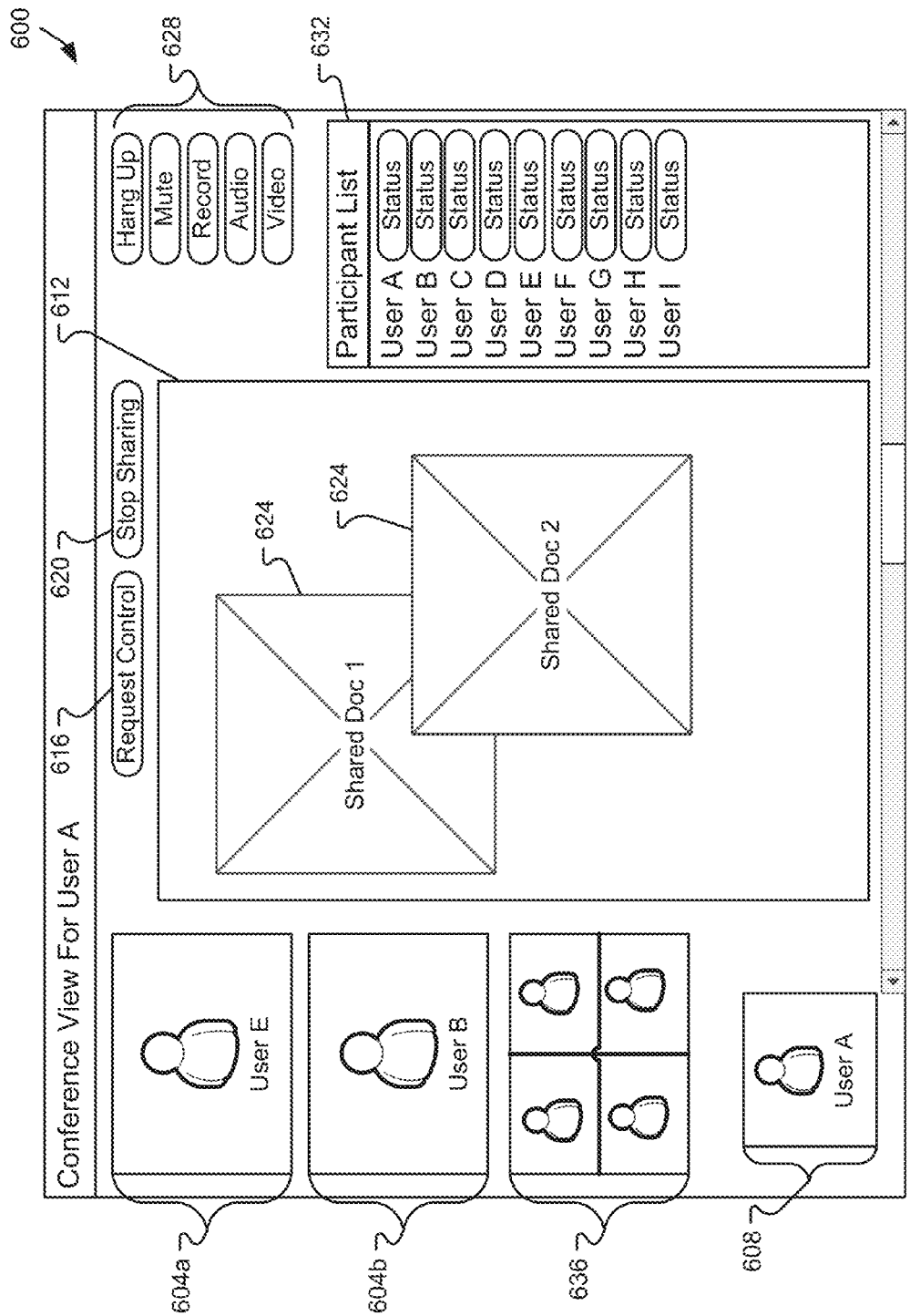
FIG. 6D is a screen-shot depicting a fourth conference view for a user involved in a video conference in accordance with embodiments of the present disclosure.

Another scenario is depicted in FIG. 6D where additional users are included in the shared viewing screen 636. In accordance with at least some embodiments of the present disclosure, the most active users, hosts of the meeting, users currently under control of the document sharing window 612, or the like may be presented in the primary viewing screens 604a, 604b whereas less active users, non-hosts, or users not controlling the document sharing window 612 may be displayed in the shared viewing screen 636. Again, the amount of bandwidth required to carry the video content being displayed in the shared viewing screen 636 may be less than is required to carry the video content being displayed in the primary viewing screens 604. At a minimum, utilization of the shared viewing screen 636 and a decreased bandwidth for the video of the users presented therein is at least saving from the need to carry full high-bandwidth video for each user in the shared viewing screen 636.

With reference now to FIGS. 7-10, various methods will be described. It should be appreciated that the steps of any method described herein may be performed in any order and by any component or combination of components depicted and/or described in connection with FIGS. 1-5. As an example, the method 700 depicted in FIG. 7 may be performed by a media server 120 and/or conference server 124 or components thereof.

Figure 7:
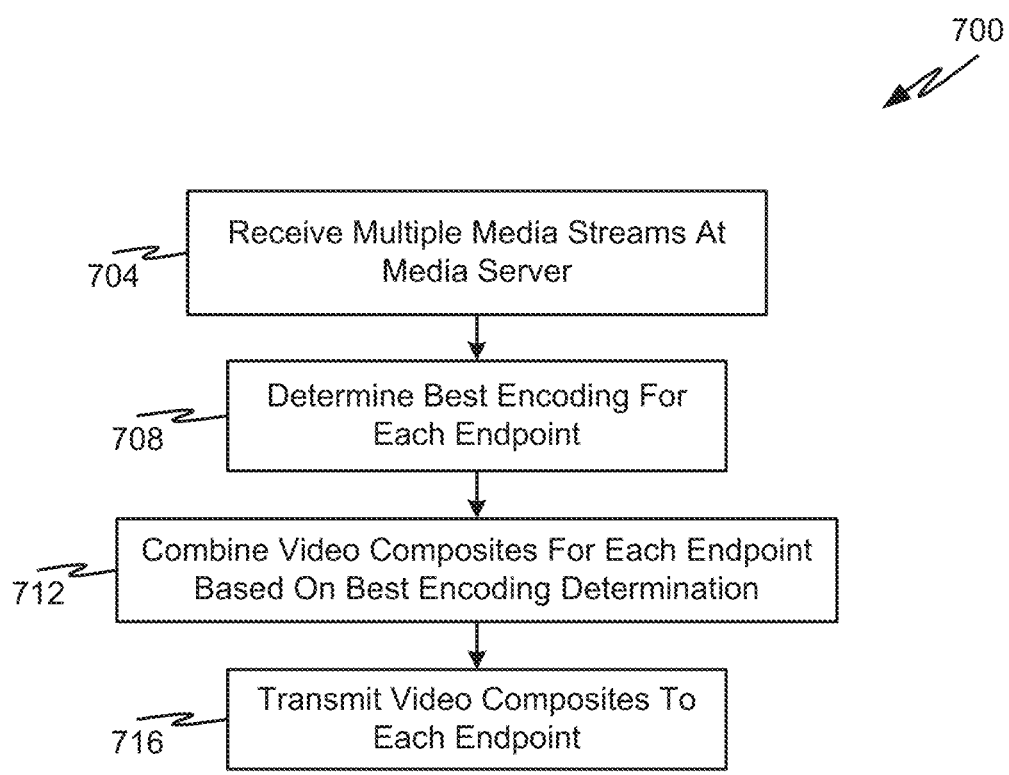
FIG. 7 is a flow chart depicting a method of delivering video composites to endpoints involved in a conference in accordance with embodiments of the present disclosure.

With reference initially to FIG. 7, a method 700 of delivering video composites to endpoints involved in a conference will be described in accordance with embodiments of the present disclosure. The method 700 begins with a media server 120, component thereof, or equivalent structure, receiving multiple media streams for conference participants involved in a communication session or conference (e.g., video conference) (step 704). Each participant's communication device 108 may deliver media in different encoding types and at different resolutions. Some communication devices 108 may provide the media server 120 with encoded media at 180*p* whereas other communication devices may provide the media server 120 with encoded media at 720p or 1080p. The quality of the media may also depend upon the network capabilities connecting the communication device 108 with the media server 120. What is described here is spatial scalability (resolution). Temporal and quality are also factors. An example would be non active talkers who are composited may have their video sent at a lower frame rate (temporal scalability) to save bandwidth and/or processing resources. The media server may also just tell the endpoint what it needs it to encode based on the requirements it sees from other endpoints in the same conference.

The method 700 continues by determining a best encoding for each endpoint (step 708). In some embodiments, the best encoding may correspond to a highest possible encoding for every media stream to be delivered to an endpoint. In some embodiments, the best encoding may correspond to a best common encoding among all media streams received at the media server 120. In some embodiments, the media server 120 may provide higher bit encoding for participants that are more active in a communication session whereas lower bit encoding can be used for less active participants or for participants that will be depicted in a shared viewing screen 636 of the receiving user's window 600.

The method 700 then mixes the video composites for each endpoint based on the best encoding determination of step 708 (step 712). The composited video composites are then transmitted to each endpoint via the communication network 104, 112 (step 716). In some embodiments, the combined media stream 208 delivered to each endpoint may be specially configured for that endpoint (e.g., to exclude that user's video and to minimize bandwidth consumption for other participants that will be depicted in a shared viewing screen 636 for that user). Transmission of the video composites for each user can be accomplished using any known video delivery techniques and can be customized for each user based on their device's capabilities, network capabilities, communication preferences, viewing preferences, relative activity in the communication session, etc.

Figure 8:
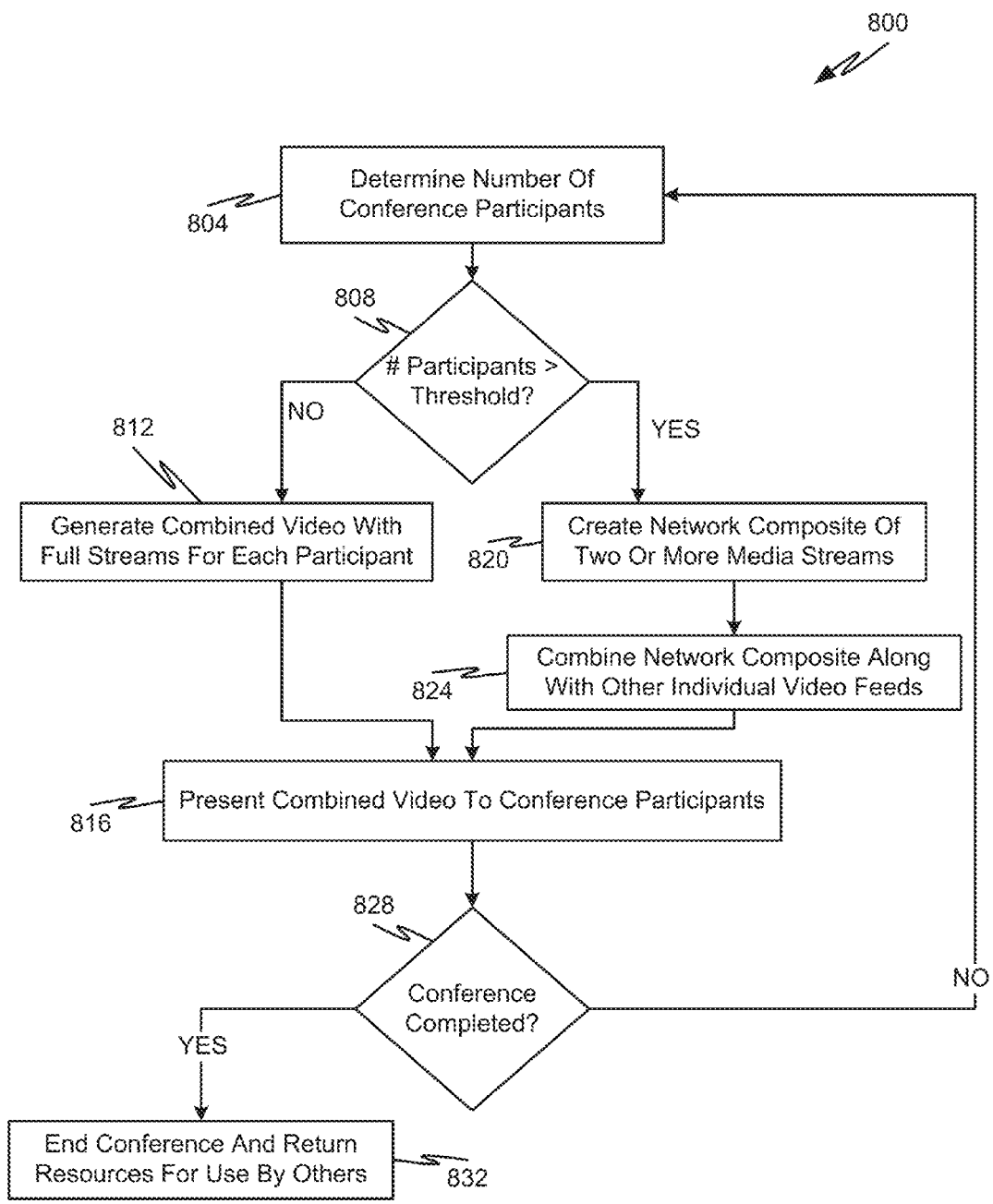
FIG. 8 is a flow chart depicting a method of dynamically adjusting a video conference presentation in accordance with embodiments of the present disclosure.

With reference now to FIG. 8, a method 800 of dynamically adjusting a video conference presentation will be described in accordance with embodiments of the present disclosure. The method 800 begins by determining a number of conference participants involved in a communication session (step 804). The determined number of participants is compared to a participant threshold (step 808). Any integer value can be used for this threshold. In the depicted example of FIGS. 6A-6D, the threshold may correspond to four participants, but it should be appreciated that a larger or smaller threshold can be used without departing from the scope of the present disclosure.

If the determined number of participants does not exceed the predetermined threshold, then the method 800 continues by utilizing the media server 120 and/or video processing resources to generate a composited video with fully encoded media streams for each participant (step 812). Each stream generated in step 812 is delivered to each participant as a combined media stream 208 so that each participant's communication device 108 can display the portions of the composited media stream in their presentation window 600 (step 816). Thereafter, the method 800 continues by determining if the conference is completed (step 828). If not, the method 800 returns to step 804.

Referring back to step 808, if the number of participants involved in the communication session at any time (e.g., at its beginning or at some point in time thereafter and before the conference is completed) exceeds the predetermined threshold, then the method 800 proceeds by creating network composites of two or more media streams (step 820). In some embodiments, the composites for each user can be custom created to include those participants that are least active in the communication session. For instance, User A may receive a composite of Users D and E if those users correspond to the least active users among Users B, C, D, and E. Simultaneously, User B may receive a composite of Users A and E if those users correspond to the least active users among Users A, C, D, and E. Thus, each composite can be different for each endpoint since a user will not receive a composite of themselves. The composite can be encoded at a lower resolution that other media streams when included in the combined media stream 208, thereby saving network bandwidth and processing resources.

The composite is then composited with the other individual feeds to form the combined media stream 208 for each user (step 824). The composited media streams 208, each containing a variation of the composited composite, are then delivered to each participant's communication device 108 (step 816). Again, the method 800 determines if the conference is completed (step 828) and, if not returns to step 804. If, however, the conference is determined to be completed, then the method 800 proceeds by ending the conference and returning any video processing resources and/or media servers back to their respective pools so that they can be used by other conferences (step 832).

Figure 9:
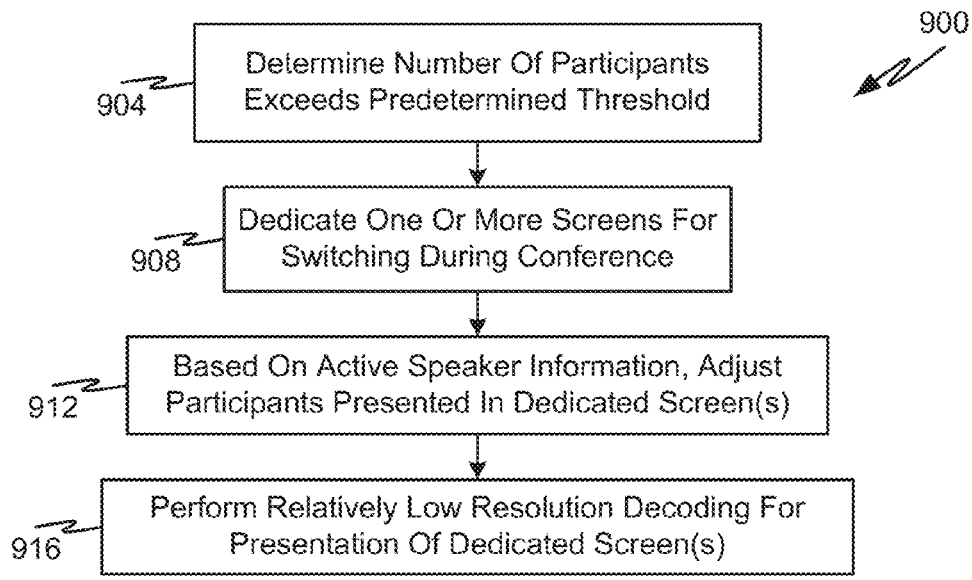
FIG. 9 is a flow chart depicting a method of adjusting participants being depicted in a composite view based on active speaker information in accordance with embodiments of the present disclosure.

With reference now to FIG. 9, a method 900 of adjusting participants being depicted in a composite view (e.g., a shared viewing screen 636) based on active speaker information will be described in accordance with embodiments of the present disclosure. The method 900 begins by determining a number of participants included in a conference current exceeds a predetermined threshold (step 904). This particular step may be similar or identical to step 808 being answered in the affirmative.

The method 900 proceeds by dedicating one or more screens of a window 600 for switching during the conference (step 908). The one or more dedicated screens may correspond to a shared viewing screen 636 of a window 600.

The method 900 then proceeds by adjusting the participants presented in the dedicated screen(s) based on active speaker information (step 912). As can be appreciated, relative voice activity (e.g., frequency of speaking) may correspond to one parameter used to determine which participants correspond to the most active or are considered active speakers. Other parameters or information that may be considered as part of determining which participants are most active speakers include voice amplitude, time since last utterance, motion frequency, time since last motion, conference host (e.g., meeting coordinator) versus non-host (e.g., non-meeting coordinator), current controller of shared documents, current controller of pointer, current participant sharing screen, or combinations thereof.

Based on the current active speaker information, the method 900 proceeds by performing relatively low resolution decoding for the presentation of participants within the dedicated screen(s) (step 916). Other participants that are not included in the presentation within the dedicated screen(s) (e.g., shared viewing screen 636) may have their video information encoded at a higher resolution and/or lower latency, thereby enabling a savings of bandwidth to avoid higher resolution for less active participants.

Figure 10:
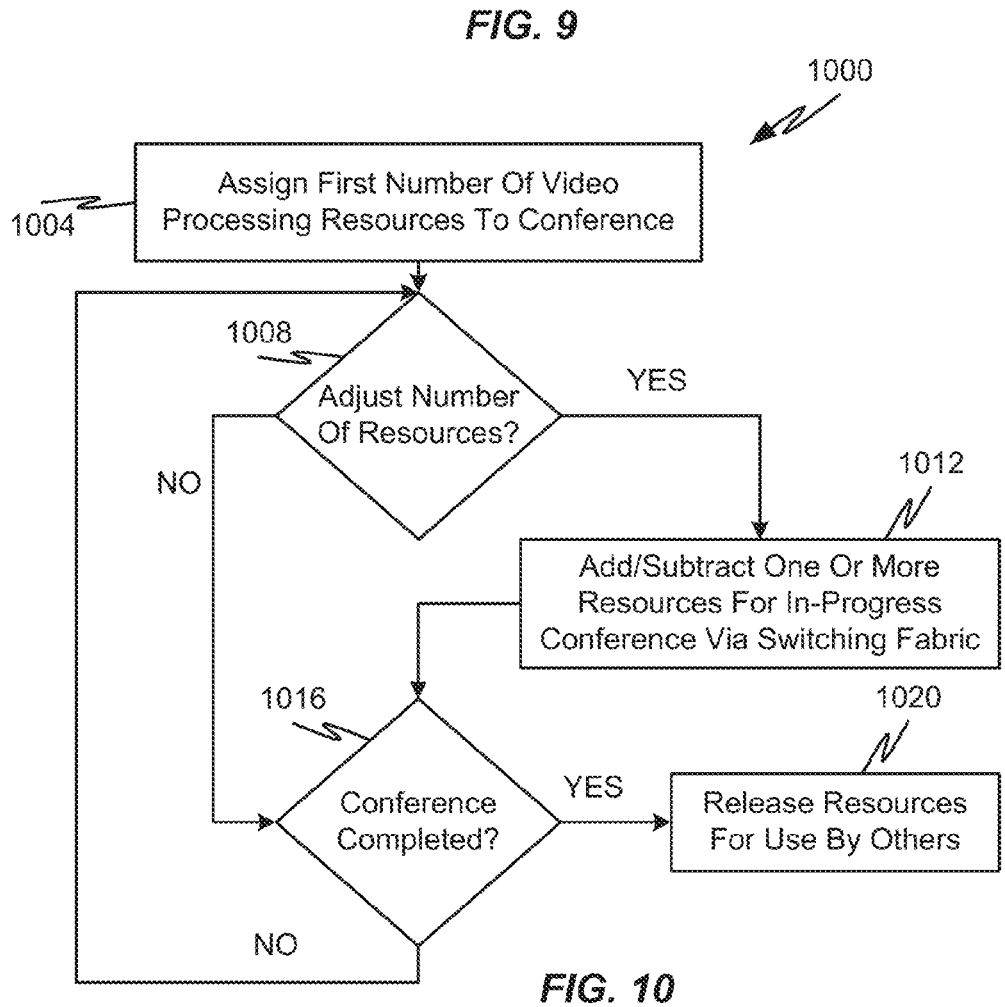
FIG. 10 is a flow chart depicting a method of dynamically adjusting a number of resources used during a conference in accordance with embodiments of the present disclosure.

With reference now to FIG. 10, a method 1000 of dynamically adjusting a number of resources used during a conference will be described in accordance with embodiments of the present disclosure. The method 1000 begins by assigning a first number of video processing resources to a conference or communication session (step 1004). The video processing resources may be made available to the conference participants and their communication devices via a switching fabric and intelligent control by a controller as described herein.

The method 1000 continues by determining whether it is necessary to adjust the number of resources made available to the communication session participants (step 1008). This may correspond to determining that the number of participants has increased and/or decreased as compared to a time when the initial determination of step 1004 was made. If the number of participants has not changed, then it can be assumed that there is no need to adjust the number of resources (e.g., increase or decrease), thus the method proceeds 1000 by determining if the conference is complete (step 1016). If not, then the method returns back to step 1008. Higher priority conferences may also take resources away from lower priority conferences. In this case a previously switched conference with processing resources may have those processing resources reaped for use by a different conference, thus falling back to switched video only. Although this would not be typical outside of military type deployments, it is a benefit because the reclaiming of resources can be less intrusive. (i.e. impacted conference is not dropped).

If the number of resources is determined to be in need of adjustment (e.g., due to an increase or decrease in conference participants), the method 1000 continues by adding or subtracting one or more resources for the in-progress communication session via manipulation of the switching fabric (step 1012). The addition or subtraction of video processing resources is seamless and transparent to the session participants. The method 1000 then proceeds to step 1016 to determine if the conference is completed. Once the conference has completed (e.g., all participants have hung up), the method 1000 continues by releasing the video processing resource and/or media server resources for use by other communication sessions (step 1020).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

The invention claimed is:

1. A system, comprising:
a microprocessor; and
a computer readable medium, coupled with the microprocessor and comprising microprocessor readable and executable instructions that program the microprocessor to execute:
  a switching fabric executed as a software framework that provides an interconnection between a plurality of communication devices involved in a conference and a processing resources backplane that enables a selective deployment of processing resources to the conference; and
  a controller that controls connections between endpoints and the processing resources backplane of the switching fabric based on a number of communication devices involved in the conference, wherein the controller is one of a plurality of controllers included in a cluster of media controllers and wherein the processing resources are a cluster of processing resources that are dynamically added and removed from the conference while the conference is in progress;
a plurality of ports connecting the switching fabric to each of the plurality of communication devices, respectively; and
one or more network interfaces that connect the processing resources backplane to the processing resources.

2. The system of claim 1, wherein the processing resources comprise a plurality of software transcoding and composite resources distributed across two or more servers each of which perform video decoding, compositing, and encoding.

3. The system of claim 1, wherein a media channel is used to carry media between the processing resources and the switching fabric and wherein a network control protocol is used to enable an exchange of control information between the processing resources and the switching fabric.

4. The system of claim 1, wherein the controller is external to the switching fabric and wherein a network control protocol is used by the controller to control the processing resources.

5. The system of claim 1, wherein the switching fabric includes a video switching fabric and an audio anchoring and compositing module, wherein a network control protocol is used to share audio and video synchronization data between the video switching fabric and the audio anchoring and compositing module, wherein the video switching fabric delivers video media to the communication devices via a first media channel, and wherein the audio anchoring and compositing module delivers audio media to the communication devices via a second media channel.

6. The system of claim 1, wherein the communication devices are each connected with the switching fabric using uniquely negotiated attachment options.

7. The system of claim 1, wherein the plurality of ports are Transmission Control Protocol (TCP) and/or User Datagram Protocol (UDP) ports.

8. A method, comprising:
providing, by a microprocessor, a switching fabric as a software framework for an interconnection between a plurality of communication devices involved in a conference and a processing resources backplane that enables a selective deployment of processing resources to the conference, wherein the switching fabric connects a plurality of ports to each of the plurality of communication devices, respectively, and wherein the processing resources backplane connects one or more network interfaces to the processing resources; and
controlling, by the microprocessor, a controller that controls connections between endpoints and the processing resources backplane of the switching fabric based on a number of communication devices involved in the conference, wherein the microprocessor controls one of a plurality of controllers included in a cluster of media controllers and wherein the processing resources are a cluster of processing resources that are dynamically added and removed from the conference while the conference is in progress.

9. The method of claim 8, wherein the processing resources comprise a plurality of software transcoding and composite resources distributed across two or more servers, each of which perform video decoding, compositing, and encoding.

10. The method of claim 8, wherein a media channel is used to carry media between the processing resources and the switching fabric and wherein a network control protocol is used to enable an exchange of control information between the processing resources and the switching fabric.

11. The method of claim 8, wherein the controller is external to the switching fabric and wherein a network control protocol is used by the controller to control the processing resources.

12. The method of claim 8, wherein the switching fabric includes a video switching fabric and an audio anchoring and compositing module, wherein a network control protocol is used to share audio and video synchronization data between the video switching fabric and the audio anchoring and compositing module, wherein the video switching fabric delivers video media to the communication devices via a first media channel, and wherein the audio anchoring and compositing module delivers audio media to the communication devices via a second media channel.

13. The method of claim 8, wherein the communication devices are each connected with the switching fabric using uniquely negotiated attachment options.

14. The method of claim 8, wherein the plurality of ports are Transmission Control Protocol (TCP) and/or User Datagram Protocol (UDP) ports.

15. A system, comprising:
a microprocessor; and
a computer readable medium, coupled with the microprocessor and comprising microprocessor readable and executable instructions that program the microprocessor to execute:
  a switching fabric executed as a software framework providing an interconnection between a plurality of communication devices involved in a conference and a processing resources backplane that enables a selective deployment of processing resources to the conference, wherein the switching fabric includes a video switching fabric and an audio anchoring and compositing module, wherein a network control protocol is used to share audio and video synchronization data between the video switching fabric and the audio anchoring and compositing module, wherein the video switching fabric delivers video media to the communication devices via a first media channel, and wherein the audio anchoring and compositing module delivers audio media to the communication devices via a second media channel; and a controller that controls connections between endpoints and the processing resources backplane of the switching fabric based on a number of communication devices involved in the conference;

a plurality of ports connecting the switching fabric to each of the plurality of communication devices, respectively; and one or more network interfaces that connect the processing resources backplane to the processing resources.

16. The system of claim 15, wherein the processing resources comprise a plurality of software transcoding and composite resources distributed across two or more servers each of which perform video decoding, compositing, and encoding.

17. The system of claim 15, wherein a media channel is used to carry media between the processing resources and the switching fabric and wherein a network control protocol is used to enable an exchange of control information between the processing resources and the switching fabric.

18. The system of claim 15, wherein the controller is external to the switching fabric and wherein a network control protocol is used by the controller to control the processing resources.

19. The system of claim 15, wherein the controller is one of a plurality of controllers included in a cluster of media controllers and wherein the processing resources are a cluster of processing resources that are dynamically added and removed from the conference while the conference is in progress.

20. The system of claim 15, wherein the communication devices are each connected with the switching fabric using uniquely negotiated attachment options.

* * * * *